US012237555B2

(12) United States Patent
Nishi et al.

(10) Patent No.: US 12,237,555 B2
(45) Date of Patent: Feb. 25, 2025

(54) WAVEGUIDE, METHOD OF MANUFACTURING WAVEGUIDE AND ANTENNA

(71) Applicant: Waseda University, Tokyo (JP)

(72) Inventors: Seiji Nishi, Tokyo (JP); Takuro Sato, Tokyo (JP); Kazuhiko Tamesue, Tokyo (JP); Tetsuya Kawanishi, Tokyo (JP)

(73) Assignee: Waseda University, Tokyo (JP)

( * ) Notice: Subject to any disclaimer, the term of this patent is extended or adjusted under 35 U.S.C. 154(b) by 198 days.

(21) Appl. No.: 18/169,211

(22) Filed: Feb. 15, 2023

(65) Prior Publication Data

US 2024/0213643 A1 Jun. 27, 2024

(30) Foreign Application Priority Data

Dec. 26, 2022 (JP) ................................ 2022-208578

(51) Int. Cl.
*H01P 3/02* (2006.01)
*H01P 1/02* (2006.01)

(52) U.S. Cl.
CPC . *H01P 3/02* (2013.01); *H01P 1/02* (2013.01)

(58) Field of Classification Search
CPC .......... H01P 1/2056; H01P 1/02; H01P 1/025; H01P 1/042; H01P 1/205; H01P 3/02; H01P 7/10
See application file for complete search history.

(56) References Cited

U.S. PATENT DOCUMENTS 11,769,952 B2 * 9/2023 Huang .................. H01Q 1/523 343/818
2016/0156109 A1 * 6/2016 Anderson ............ H01Q 21/062 29/601
2021/0126334 A1 * 4/2021 Baur ...................... G01S 7/032

FOREIGN PATENT DOCUMENTS

JP 200520077 A 1/2005

* cited by examiner

*Primary Examiner* — Monica C King
(74) *Attorney, Agent, or Firm* — HAUPTMAN HAM, LLP

(57) ABSTRACT

The first conductor plate has a groove portion that has a rectangular cross section and is formed in parallel with a first main surface such that the longitudinal direction becomes a first direction, and a first vertical tube portion formed in a direction away from the second conductor plate in a second direction orthogonal to the first direction and the first main surface, with a branch position in the groove as a starting point. The second conductor plate includes a reflection portion that is inserted into the groove portion in a manner protruding from a second main surface, which is a flat surface of the second conductor plate in contact with the first main surface, and has a reflection surface that reflects the radio wave, propagated along the groove portion, toward the first vertical tube portion.

7 Claims, 10 Drawing Sheets

WAVEGUIDE, METHOD OF MANUFACTURING WAVEGUIDE AND ANTENNA

CROSS-REFERENCE TO RELATED APPLICATIONS

The present application claims priority to Japanese Patent Application number 2022-208578, filed on Dec. 26, 2022, contents of which are incorporated herein by reference in their entirety.

BACKGROUND OF THE INVENTION

The present invention relates to a waveguide, a method of manufacturing a waveguide, and an antenna.

Conventionally, as described in Japanese Unexamined Patent Application Publication No. 2005-20077, there has been known a bent waveguide in which a plurality of waveguides having different directions are connected.

A conventional waveguide is formed by covering the waveguide and a metal member with a metal plate, in a state in which the metal member having a tapered surface of 45 degrees on one side is fitted to an intersection of two orthogonal waveguides. When the frequency of the signal transmitted by the waveguide is increased, it is necessary to reduce the diameters of the waveguide and the metal member. If the diameters of the waveguide and the metal member are reduced, the influence of positional displacement of the metal member on the frequency characteristic of the waveguide is increased.

BRIEF SUMMARY OF THE INVENTION

The present invention has been made in view of the above circumstances, and an object of the present invention is to realize miniaturization of a waveguide while maintaining favorable frequency characteristics of the waveguide.

A waveguide according to a first aspect of the present invention is a waveguide having a first conductor plate and a second conductor plate in contact with the first conductor plate, wherein the first conductor plate includes: a groove portion that has a rectangular cross section and is formed parallel to a first main surface, which is a flat surface of the first conductor plate on the second conductor plate side, such that a longitudinal direction of the groove portion is a first direction; and a first vertical tube portion formed in a direction away from the second conductor plate in a second direction, which is orthogonal to the first direction and the first main surface, starting from a branch position in the groove portion; and the second conductor plate includes a reflective portion that is inserted into the groove portion and protrudes from a second main surface, which is a flat surface of the second conductor plate in contact with the first main surface, and has a reflective surface which reflects a radio wave, propagated along the groove portion, toward the first vertical tube portion.

A method of manufacturing a waveguide according to a second aspect of the present invention a method of manufacturing a waveguide, comprising: forming, in a first conductor plate material, a groove portion that has a rectangular cross section such that a longitudinal direction of the groove portion becomes a first direction and the groove portion is parallel to a first main surface of the first conductor plate material; manufacturing a first conductor plate by forming, in the first conductor plate material, a vertical pipe portion extending in a second direction, which is orthogonal to the first direction and the first main surface, starting from a branch position in the groove portion; a step of manufacturing a second conductor plate by forming, in a second conductor plate material different from the first conductor plate material, a reflective portion having a reflective surface for reflecting a radio wave, propagated along the groove portion, toward the vertical tube portion, such that the reflective portion protrudes from a second main surface of the second conductor plate material in contact with the first main surface; and coupling the first conductor plate and the second conductor plate such that the first main surface and the second main surface are in contact with each other in a state where the reflective portion is inserted into the groove portion, after forming the first conductor plate and the second conductor plate.

An antenna according to a third aspect of the present invention is an antenna comprising: an antenna element having an antenna port; and a waveguide connected to the antenna port, wherein the waveguide is a waveguide having a first conductor plate and a second conductor plate in contact with the first conductor plate, the first conductor plate includes: a groove portion that has a rectangular cross section and is formed parallel to a first main surface, which is a flat surface of the first conductor plate on the second conductor plate side, such that the longitudinal direction of the groove portion is a first direction; and a first vertical tube portion formed in a direction away from the second conductor plate in a second direction, which is orthogonal to the first direction and the first main surface, starting from a branch position in the groove portion; and the second conductor plate includes: a second vertical tube portion formed in the second direction between the antenna port and the groove portion; a reflective portion which is inserted into the groove portion in a manner to project from a second main surface, which is a flat surface of the second conductor plate in contact with the first main surface, and has a reflective surface which reflects a radio wave, propagated along the groove portion, toward the first vertical tube portion.

DETAILED DESCRIPTION OF THE INVENTION

Hereinafter, the present invention will be described through embodiments of the invention, but the following embodiments do not limit the invention as in the claims, and all combinations of features described in the embodiments are not necessarily essential to means for solving the invention.

[Configuration of Waveguide 1]

Figure 1:
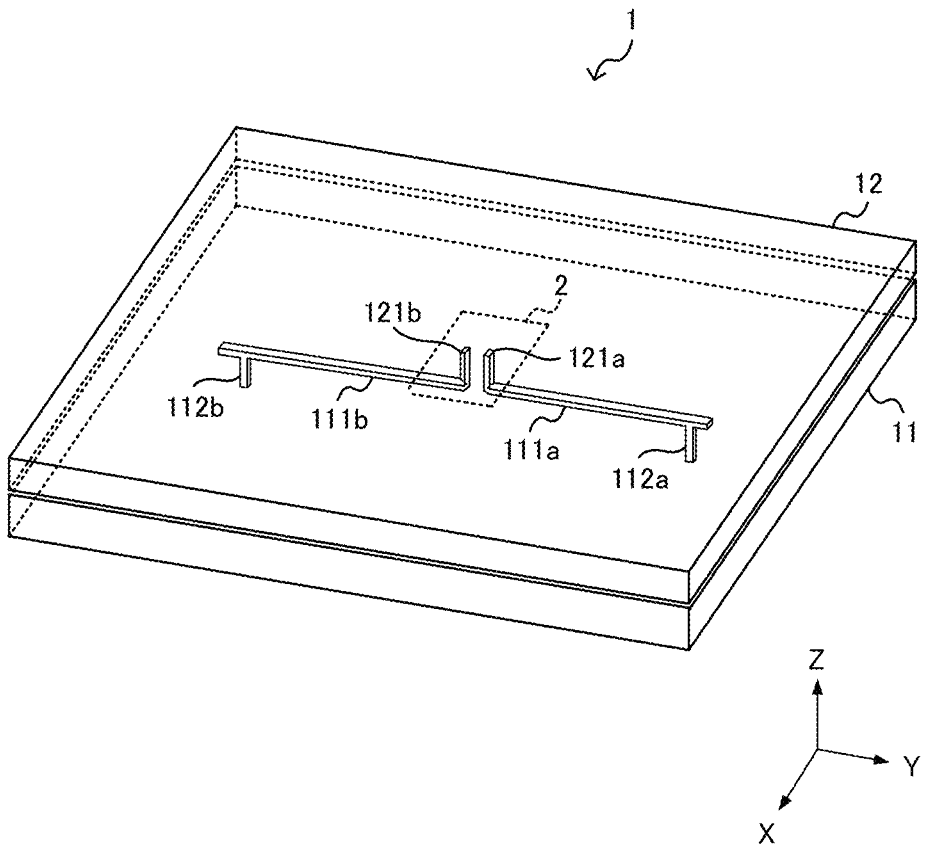
FIG. 1 is a perspective view showing an outline of a configuration of a waveguide 1.
Figure 2:
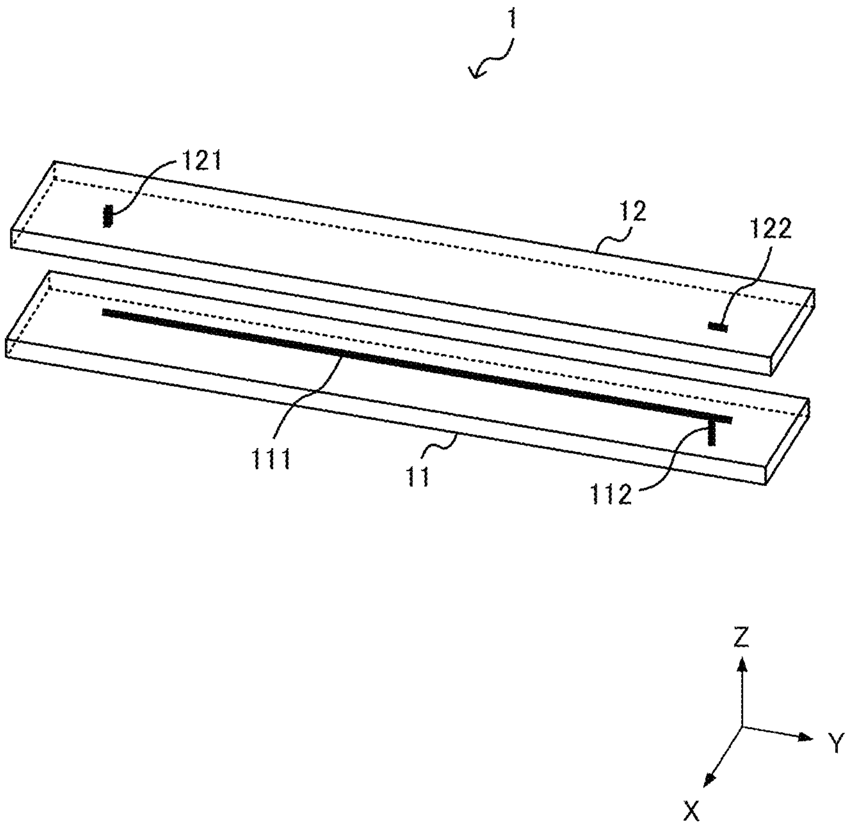
FIG. 2 is an exploded view of a portion of the waveguide 1.
Figure 3A:
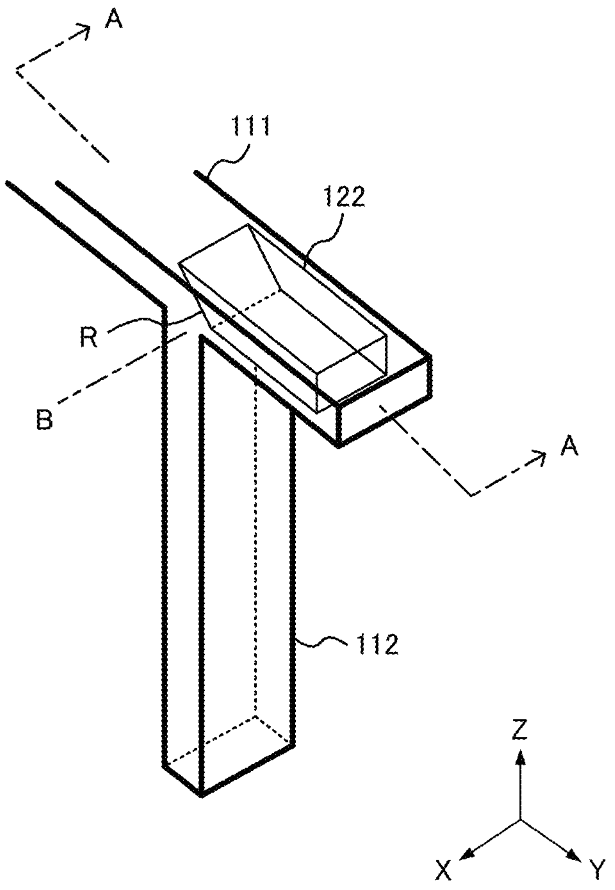
FIGS. 3A and 3B are enlarged views of a partial region of the waveguide 1.
Figure 3B:
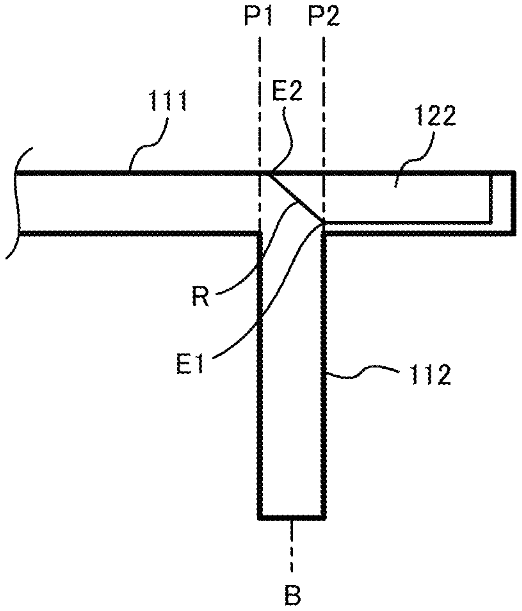

FIG. 1 is a perspective view showing an outline of a configuration of a waveguide 1. FIG. 2 is an exploded view of a portion of the waveguide 1. FIGS. 3A and 3B are enlarged views of a partial region of the waveguide 1.

As shown in FIG. 1, the waveguide 1 is configured to be connected to an antenna element 2. An antenna is formed by connecting the antenna element 2 to the waveguide 1. The waveguide 1 has a waveguide that propagates a radio wave input from an output port of the antenna element 2. The waveguide 1 propagates a radio wave input from the antenna element 2 to a position different from the output port of the antenna element 2, and outputs the radio wave. In the example shown in FIG. 1, the waveguide 1 has two waveguides, but the waveguide 1 may have one waveguide or three or more waveguides.

The waveguide 1 includes a first conductor plate 11 and a second conductor plate 12 in contact with the first conductor plate 11. The first conductor plate 11 and the second conductor plate 12 are each made of, for example, a rectangular plate-shaped metal (for example, copper), but the shapes of the first conductor plate 11 and the second conductor plate 12 are arbitrary. In order to facilitate alignment between the first conductor plate 11 and the second conductor plate 12 at the time of manufacturing the waveguide 1, the shapes of the first conductor plate 11 and the second conductor plate 12 are desirably shapes in which a plurality of side surfaces of the first conductor plate 11 and a plurality of corresponding side surfaces of the second conductor plate 12 are positioned in the same plane, in a state where the first conductor plate 11 and the second conductor plate 12 are brought into contact with each other.

The first conductor plate 11 includes a groove 111 and a first vertical tube portion 112. The second conductor plate 12 includes a second vertical tube portion 121 and a reflection portion 122. In FIG. 1, a first waveguide reaching a first vertical tube portion 112*a* from a second vertical tube portion 121*a* via a groove portion 111*a* and a second waveguide reaching a first vertical tube portion 112*b* from a second vertical tube portion 121*b* via a groove portion 111*b* are shown at positions symmetrical with respect to the antenna element 2. In the following description, the first waveguide that reaches the first vertical tube portion 112*a* from the second vertical tube portion 121*a* via the groove portion 111*a* will be described as an example.

The groove portion 111 is formed parallel to a first main surface, which is a flat surface of the first conductor plate 11 on the second conductor plate 12 side, such that the longitudinal direction thereof becomes a first direction. The cross section of the groove 111 is rectangular. The first direction in the example shown in FIG. 1 is, for example, the longitudinal direction of the first conductor plate 11 and the second conductor plate 12, and is the Y direction in FIGS. 1 to 3.

A reflection surface for changing the direction of a radio wave, incident from the antenna element 2 in the Z direction through the second vertical tube portion 121, to the Y direction is formed at an end portion of the groove portion 111 corresponding to a position where the groove portion 111 is coupled to the second vertical tube portion 121. Since the propagation direction of the radio wave changes by 90° at the reflection surface, the second vertical tube portion 121 and the groove portion 111 function as a first corner waveguide.

The first vertical tube portion 112 is formed in a direction away from the second conductor plate 12 in a second direction, which is orthogonal to the first direction and the first main surface, starting from a branch position in the groove portion 111. The second direction is the thickness direction of the first conductor plate 11, and is the Z direction in FIGS. 1 to 3. The branch position is a center position of the first vertical tube portion 112 in the first direction, as indicated by the symbol B in FIGS. 3A and 3B. The first vertical tube portion 112 is formed to penetrate the waveguide 1, for example. The cross section of the first vertical tube portion 112 is rectangular, for example.

One end of the second vertical tube portion 121 is coupled to the antenna element 2, and the other end of the second vertical tube portion 121 is coupled to the groove portion 111. As shown in FIGS. 1 and 2, the second vertical tube portion 121 extends in the second direction from the end portion of the groove portion 111 opposite to the side where the first vertical tube portion 112 is formed, and penetrates through the second conductor plate 12. The cross section of the second vertical tube portion 121 is rectangular, for example.

As shown in the perspective view of FIG. 3A, the reflective portion 122 is inserted into the groove portion 111 in a manner protruding from a second main surface, which is a flat surface of the second conductor plate 12 in contact with the first main surface. The reflection portion 122 has a reflection surface R that reflects a radio wave, propagated along the groove portion 111 in the Y direction, toward the first vertical tube portion 112 in the Z direction. Since the propagation direction of the radio wave changes by 90° at the reflection surface R, the groove 111, the reflection portion 122, and the first vertical tube portion 112 function as a second corner waveguide.

The reflective portion 122 may be formed by cutting the conductor plate with a drill, or may be connected to the conductor plate in a pre-formed state. In a case where the reflective portion 122 is cut by a drill, since it is difficult to form a reflective surface R that is completely flat, the reflective surface R may be formed with a stepped shape.

The reflection portion 122 is inserted in a region of the groove portion 111 farther away from the branch position B than the second vertical tube portion 121 (right-hand side in FIG. 3A). The width of the reflection portion 122 in a third direction (the X direction in FIGS. 1 to 3), which is orthogonal to the first direction and the second direction, is smaller than the width of the groove portion 111 in the third direction, so as to be accommodated in the groove portion 111. As shown in FIG. 3A, the end surface of the reflective portion 122 opposite the side where the reflective surface R is formed need not be in contact with the inner surface of the groove portion 111, but may be in contact with the inner surface of the groove portion 111.

FIG. 3B is a cross-sectional view taken along the line A-A of the region shown in FIG. 3A. As shown in FIG. 3B, the reflective portion 122 need not be in contact with the lower surface of the groove portion 111, but may be in contact with the lower surface of the groove portion 111.

As shown in FIG. 3B, the reflection surface R has a reflection region located between a position P1 in the first direction on the surface of the first vertical tube portion 112 closest to the side where the radio wave is incident and a position P2 in the first direction on the surface of the first vertical tube portion 112 farthest from the side where the radio wave is incident.

As an example, the position in the first direction of a first end portion E1 of the reflection surface R on the side of the first conductor plate 11 is the same as a position P2 in the first direction of the surface of the first vertical tube portion 112 that is farthest from the incident side where the radio wave is incident. The position in the first direction of a second end portion E2 of the reflection surface R opposite to the first end portion E1 is between a position P1 in the first direction of the surface of the first vertical tube portion 112 closest to the incident side and a position P2 in the first direction of the surface of the first vertical tube portion 112 farthest from the incident side. By providing the reflection surface R at such a position, the radio wave reflected by the reflection surface R is likely to propagate along the first vertical tube portion 112 without hitting the lower surface of the groove portion 111. As a result, a decrease in the intensity of the radio wave output from the waveguide 1 can be prevented.

[Method of Manufacturing the Waveguide 1]

An example of a method of manufacturing the waveguide 1 will be described.

First, an unprocessed first conductor plate material and an unprocessed second conductor plate material are prepared. Then, a groove 111 having a rectangular cross section is formed in the prepared first conductor plate material, such that the longitudinal direction thereof becomes the first direction and the groove 111 is parallel to the first main surface of the first conductor plate material. A reflection surface inclined by 45° with respect to the first main surface and the first direction is formed at one end of the groove 111. At the other end of the groove 111, an end surface orthogonal to the first main surface and the first direction is formed.

Subsequently, the first vertical pipe portion 112 extending in the second direction, which is orthogonal to the first direction and the first main surface, is formed in the first conductor plate material starting from the branch position in the groove portion 111, whereby the first conductor plate 11 is completed. The method of forming the groove portion 111 and the first vertical tube portion 112 is arbitrary, but the groove portion 111 and the first vertical tube portion 112 can be formed by a milling machine, for example.

Before or after the processing of the first conductor plate material, or in parallel with the processing of the first conductor plate material, the second vertical tube portion 121 and the reflection portion 122 are formed in the unprocessed second conductor plate material. Specifically, the second conductor plate material is processed such that a region other than the reflective portion 122 is cut off from the unprocessed second conductor plate material, thereby leaving the reflective portion 122 in a protruding state. After this, the second vertical tube portion 121 is formed to complete the second conductor plate 12. Although the method of forming the second vertical tube portion 121 and the reflection portion 122 is arbitrary, a milling machine can be used, for example.

After the groove portion 111, the first vertical tube portion 112, the second vertical tube portion 121, and the reflection portion 122 are formed, the first conductor plate 11 and the second conductor plate 12 are coupled such that the first main surface (the surface on which the groove portion 111 is formed) of the first conductor plate 11 and the second main surface (the surface on which the reflection portion 122 is formed) of the second conductor plate 12 come into contact with each other in a state where the reflection portion 122 is inserted into the groove portion 111. In a case where the flat surface shapes of the first conductor plate and the second conductor plate are the same, by coupling the first conductor plate 11 and the second conductor plate 12 such that the four sides of the first conductor plate and the four sides of the second conductor plate coincide with each other, the reflection portion 122 can be inserted at a desired position with high accuracy.

[Simulation Results]

Figure 4A:
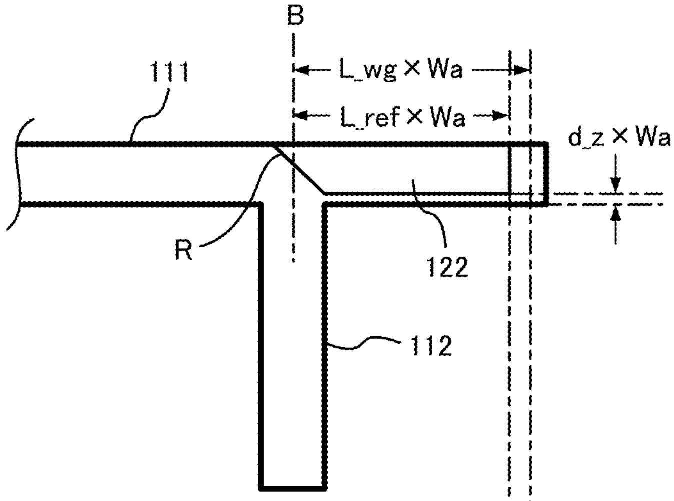
FIGS. 4A and 4B are diagrams illustrating parameters used in a simulation.
Figure 4B:
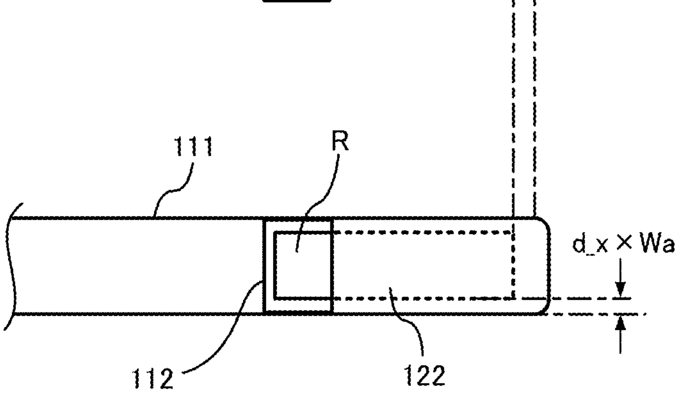

Hereinafter, results of a simulation of characteristics of the waveguide 1 will be described with reference to FIGS. 4 to 9. FIGS. 4A and 4B are diagrams illustrating parameters used in the simulation.

FIG. 4A is a cross-sectional view taken along the line A-A, which is equivalent to the view in FIG. 3B. FIG. 4B is a view showing a state in which the waveguide 1 is viewed from the end portion side of the first vertical tube portion 112, in the direction of the second conductor plate 12. When the groove portion 111 is cut by a drill, it is difficult to make the angle of the groove portion 111 a right angle, and therefore, in FIG. 4B, the angle of the right end portion of the groove portion 111 is arc-shaped.

As shown in FIG. 4A, the distance between the lower surface of the reflective portion 122 and the inner surface on the lower side of the groove portion 111 is d_z×Wa. The distance between the branch position B and an end surface of the reflective portion 122 on the side opposite the reflective surface R is L_ref×Wa. The distance between the branch position B and the end surface of the groove 111 is L_wg×Wa. As shown in FIG. 4B, the distance between the side surface of the reflective portion 122 and the inner side surface of the groove portion 111 is d_x×Wa. Here, Wa is an internal width as defined by the rectangular waveguide standard. As an example, in the case of a waveguide that is WR-3, Wa=0.864 mm. A position where the longitudinal side surface of the groove 111 begins to bend inward is defined as an end surface of the groove 111.

Figure 5A:
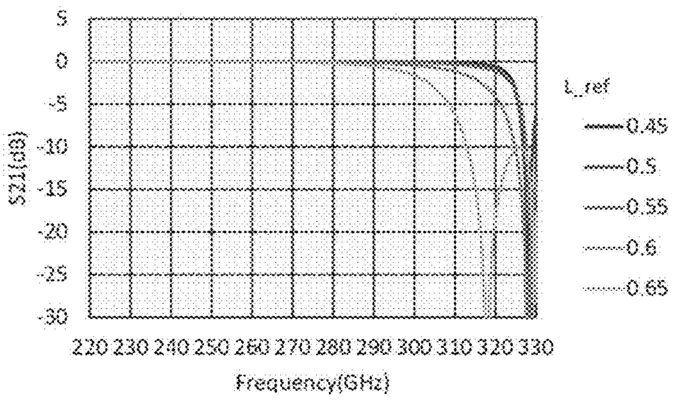
FIGS. 5A to 5C are diagrams showing simulation results of an L_ref dependency of transmission characteristics of the waveguide 1.
Figure 5B:
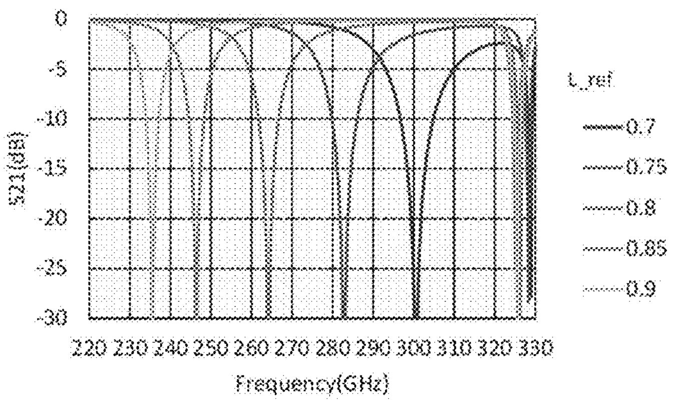
Figure 5C:
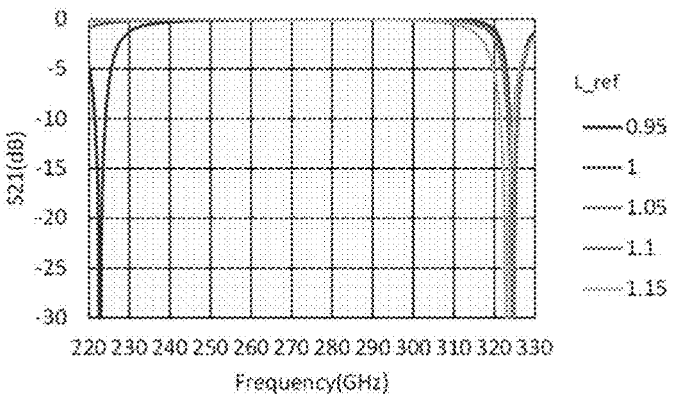
Figure 6D:
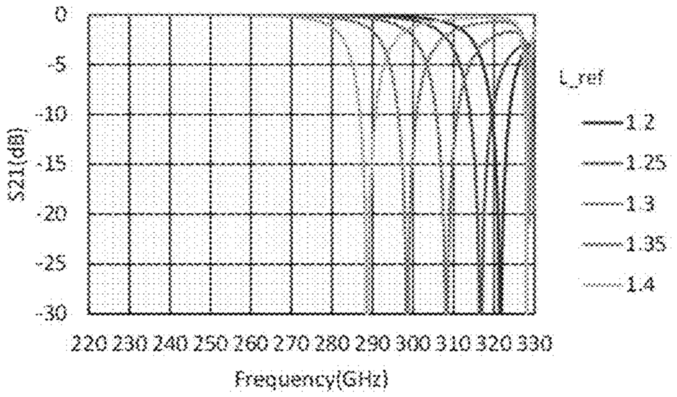
FIGS. 6D to 6F are diagrams showing simulation results of the L_ref dependency of transmission characteristics of the waveguide 1.
Figure 6E:
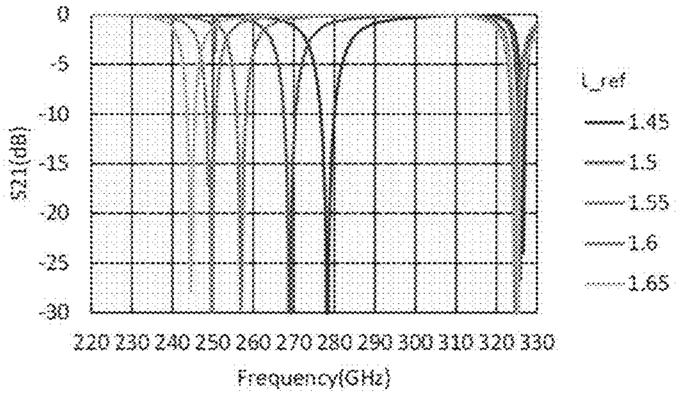
Figure 6F:
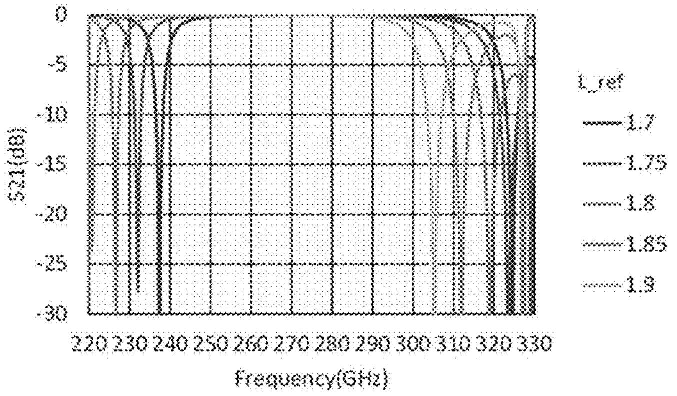

FIGS. 5 and 6 show simulation results of the L_ref dependency of the transmission characteristic of the waveguide 1. Specifically, FIGS. 5 and 6 show frequency characteristics of the transmission coefficient S21 when (L_wg-L_ref)×Wa=0.1 mm, d_z×Wa=0.05 mm, and d_x×Wa=0.138 mm. It was confirmed that, if L_ref is in a range of 0.45 or more and 0.60 or less, 0.90 or more and 1.20 or less, or 1.60 or more and 1.90 or less, no resonance point is generated in the transmission coefficient S21 in a range where the frequency of the radio wave propagating through the waveguide 1 is 240 GHz or more and 300 GHz or less.

This frequency range varies depending on the size of the waveguide. Specifically, with the inner width of the waveguide as defined by the rectangular waveguide standard being Wa [mm] and the light speed being C0 [$10^6$ m/s], it was confirmed that the frequency of the radio wave is 1.4×C0/(2×Wa) [GHz] or more and 1.7×C0/(2×Wa) [GHz] or less.

Figure 7A:
FIGS. 7A to 7C are diagrams showing simulation results of a d_x dependency of transmission characteristics of the waveguide 1.
Figure 7B:
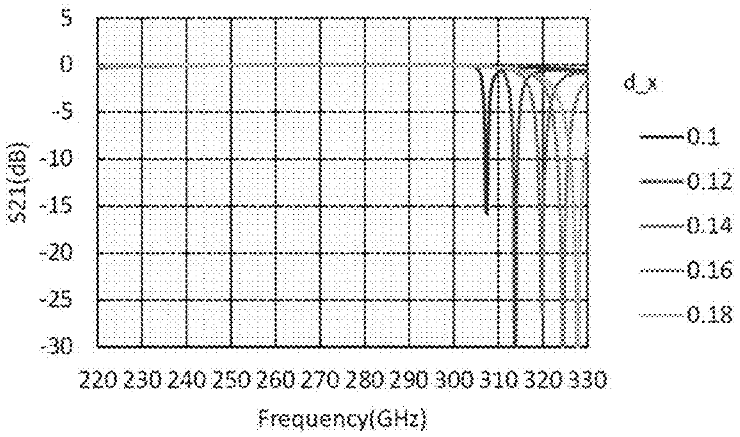
Figure 7C:
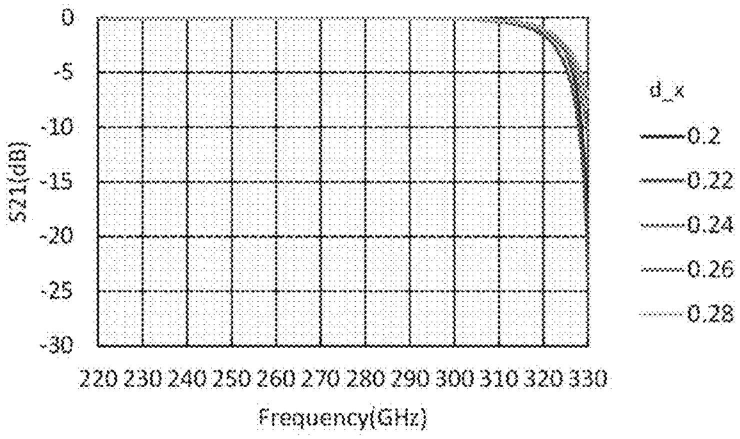
Figure 8D:
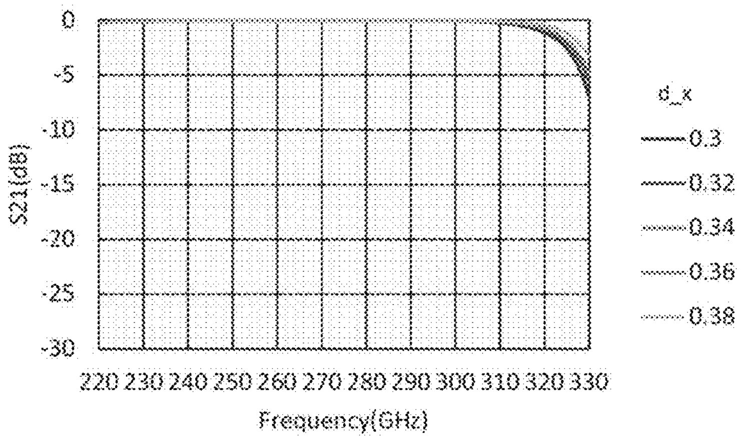
FIGS. 8D and 8E are diagrams showing simulation results of the d_x dependency of transmission characteristics of the waveguide 1.
Figure 8E:
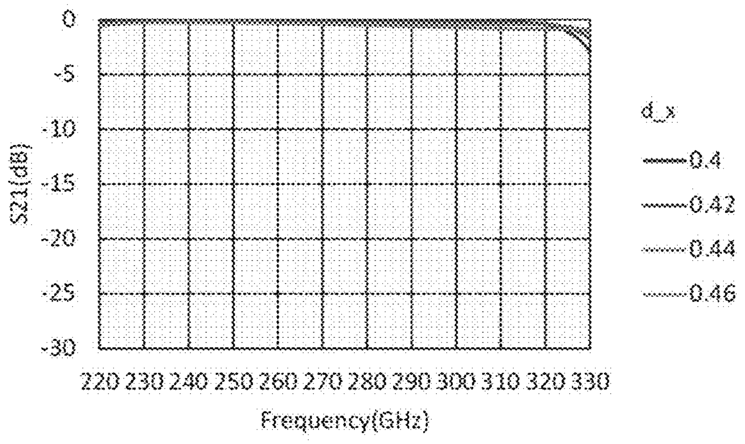

FIGS. 7 and 8 show simulation results of the d_x dependency of transmission characteristics of the waveguide 1. Specifically, FIGS. 7 and 8 show frequency characteristics of the transmission coefficient S21 when (L_wg-L_ref)×Wa=0.1 mm, d_z×Wa=0.05 mm, and L_ref=0.105. It was confirmed that, when d_x is equal to or greater than 0.12, no resonance point is generated in the transmission coefficient S21 in a range in which the frequency of the radio wave propagating through the waveguide 1 is equal to or greater than 240 GHz and equal to or less than 300 GHz.

Figure 9A:
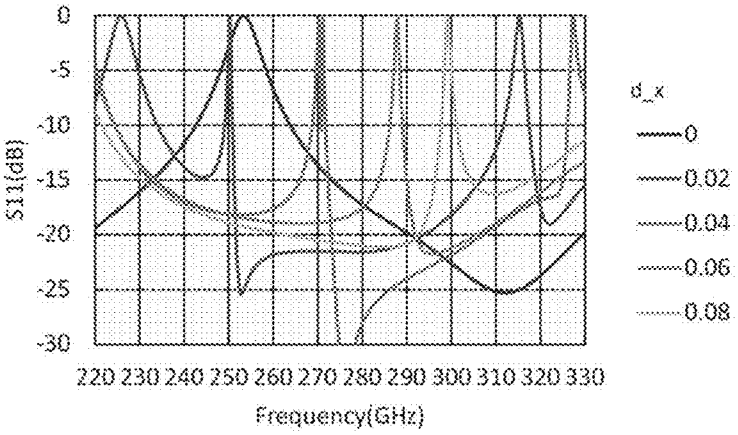
FIGS. 9A to 9C are diagrams showing simulation results of the d_x dependency of reflection characteristics of the waveguide 1.
Figure 9B:
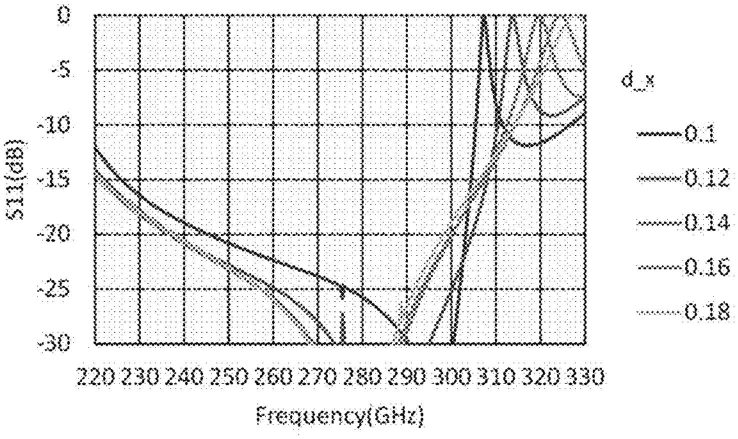
Figure 9C:
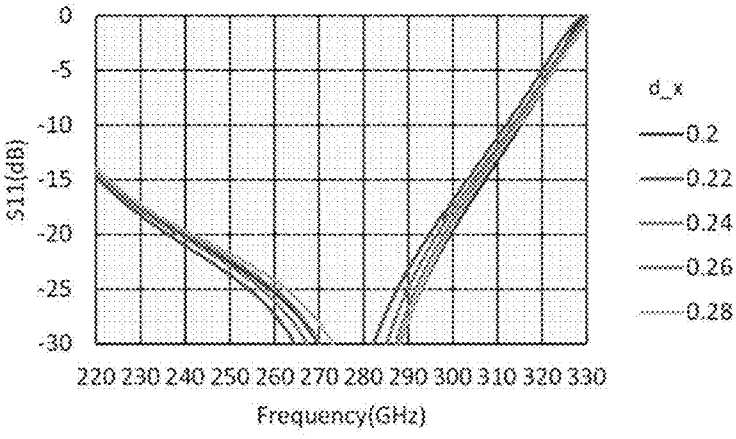
Figure 10D:
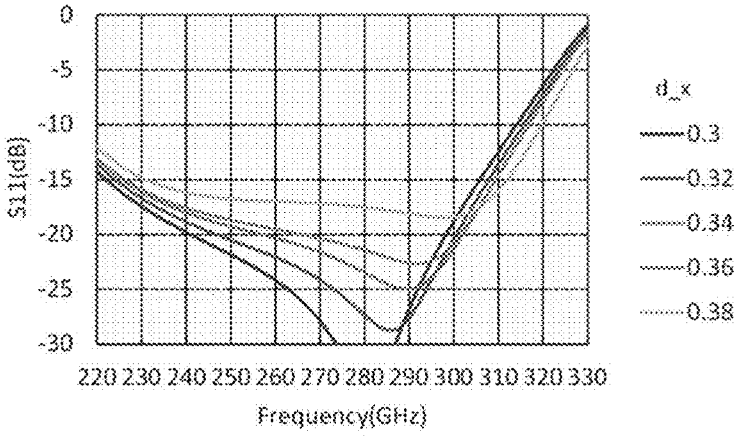
FIGS. 10D and 10E are diagrams showing simulation results of the d_x dependency of reflection characteristics of the waveguide 1.
Figure 10E:
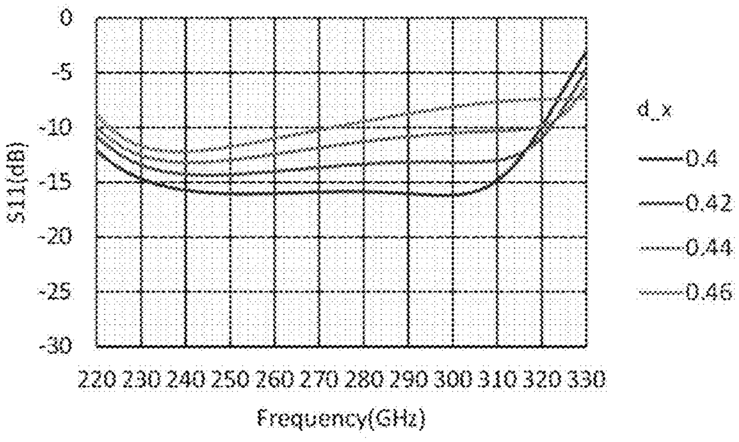

FIGS. 9 and 10 show simulation results of the d_x dependency of the reflection characteristic of the waveguide 1. Specifically, FIGS. 9 and 10 show the frequency characteristic of the input reflection coefficient S11 when (L_wg-L_ref)×Wa=0.1 mm, d_z×Wa=0.05 mm, and L_ref=0.105. It was confirmed that, when d_x is 0.38 or more, the input reflection coefficient S11 deteriorated in a range in which the frequency of the radio wave propagating through the waveguide 1 is 240 GHz or more and 300 GHz or less.

From the results shown with reference to FIGS. 7 and 8 and the results shown with reference to FIGS. 9 and 10, it was confirmed that d_x is desirably equal to or greater than 0.12 and less than 0.38. That is, it was confirmed that the distance d_x×Wa between the outer surface of the reflective portion 122 parallel to the first direction and the inner surface of the groove portion 111 parallel to the first direction is preferably equal to or greater than 12% and less than 38% of the distance between the two inner surfaces of the groove portion 111.

[Effect of the Waveguide 1]

As described above, the waveguide 1 includes the first conductor plate 11 and the second conductor plate 12. The first conductor plate 11 includes the groove portion 111, which has a rectangular cross section and is formed parallel to the first main surface of the first conductor plate 11 such that the longitudinal direction of the groove portion 111 becomes the first direction, and a first vertical tube portion 112 formed in a direction away from the second conductor plate 12 starting from the branch position B in the groove portion 111. The second conductor plate 12 includes the reflection portion 122 having a reflection surface R that reflects a radio wave, propagated along the groove portion 111, toward the first vertical tube portion 112, with the reflection surface 122 being inserted into the groove portion 111 in a manner protruding from the second main surface which is a flat surface in contact with the first main surface in the second conductor plate.

Since the waveguide 1 is configured in this manner, by aligning the positions of the first conductor plate 11 and the second conductor plate 12, the reflection portion 122 is fixed at a desired position with high accuracy. As a result, the waveguide can be downsized while maintaining favorable frequency characteristics of the waveguide.

Although the embodiments of the present invention have been described above, the technical scope of the present invention is not limited to the embodiments described above, and various modifications and changes can be made without departing from the scope of the present invention. For example, all or a portion of the device may be functionally or physically distributed and integrated in arbitrary units. Further, new embodiments resulting from arbitrary combinations of a plurality of embodiments are also included in the embodiments of the present invention. The effect of the new embodiment caused by the combination has the effect of the original embodiment.

What is claimed is:

1. A waveguide having a first conductor plate and a second conductor plate in contact with the first conductor plate, wherein the first conductor plate includes:

a groove portion that has a rectangular cross section and is formed parallel to a first main surface, which is a flat surface of the first conductor plate on the second conductor plate side, such that a longitudinal direction of the groove portion is a first direction; and a first vertical tube portion formed in a direction away from the second conductor plate in a second direction, which is orthogonal to the first direction and the first main surface, starting from a branch position in the groove portion; and the second conductor plate includes a reflective portion that is inserted into the groove portion and protrudes from a second main surface, which is a flat surface of the second conductor plate in contact with the first main surface, and has a reflective surface which reflects a radio wave, propagated along the groove portion, toward the first vertical tube portion.

2. The waveguide according to claim 1, wherein the reflective surface has a reflective region positioned between i) a position in the first direction of a surface of the first vertical tube portion closest to a side where the radio wave is incident and ii) a position in the first direction of a surface of the first vertical tube portion farthest from the side where the radio wave is incident.

3. The waveguide according to claim 1, wherein a position in the first direction of a first end portion of the reflective surface on the first conductor plate side is the same as a position in the first direction of a surface of the first vertical tube portion farthest from an incident side where the radio wave is incident;

a position in the first direction of a second end portion of the reflective surface, which is opposite to the first end portion, is between a position in the first direction of a surface of the first vertical tube portion closest to the incident side and a position in the first direction of a surface of the first vertical tube portion farthest from the incident side.

4. The waveguide according to claim 1, wherein the second conductor plate further includes a second vertical tube portion that extends in the second direction, from an end portion of the groove portion opposite to a side where the first vertical tube portion is formed, and penetrates through the second conductor plate.

5. The waveguide according to claim 1, wherein in a case where an inner width of the waveguide as defined by a rectangular waveguide standard is Wa [mm] and a light speed is C0 [$10^6$ m/s]:

a frequency of the radio wave is 1.4×C0/(2×Wa) [GHz] or more and 1.7×C0/(2×Wa) [GHz] or less; and a distance between an outer surface of the reflective portion parallel to the first direction and an inner surface of the groove portion parallel to the first direction is equal to or greater than 12% and less than 38% of a distance between two inner surfaces of the groove portion.

6. A method of manufacturing a waveguide, comprising:

forming, in a first conductor plate material, a groove portion that has a rectangular cross section such that a longitudinal direction of the groove portion becomes a first direction and the groove portion is parallel to a first main surface of the first conductor plate material;

manufacturing a first conductor plate by forming, in the first conductor plate material, a vertical pipe portion extending in a second direction, which is orthogonal to the first direction and the first main surface, starting from a branch position in the groove portion;

a step of manufacturing a second conductor plate by forming, in a second conductor plate material different from the first conductor plate material, a reflective portion having a reflective surface for reflecting a radio wave, propagated along the groove portion, toward the vertical tube portion, such that the reflective portion protrudes from a second main surface of the second conductor plate material in contact with the first main surface; and coupling the first conductor plate and the second conductor plate such that the first main surface and the second main surface are in contact with each other in a state where the reflective portion is inserted into the groove portion, after forming the first conductor plate and the second conductor plate.

7. An antenna comprising:

an antenna element having an antenna port; and a waveguide connected to the antenna port, wherein the waveguide is a waveguide having a first conductor plate and a second conductor plate in contact with the first conductor plate, the first conductor plate includes:

a groove portion that has a rectangular cross section and is formed parallel to a first main surface, which is a flat surface of the first conductor plate on the second conductor plate side, such that the longitudinal direction of the groove portion is a first direction; and a first vertical tube portion formed in a direction away from the second conductor plate in a second direction, which is orthogonal to the first direction and the first main surface, starting from a branch position in the groove portion; and the second conductor plate includes:

a second vertical tube portion formed in the second direction between the antenna port and the groove portion;

a reflective portion which is inserted into the groove portion in a manner to project from a second main surface, which is a flat surface of the second conductor plate in contact with the first main surface, and has a reflective surface which reflects a radio wave, propagated along the groove portion, toward the first vertical tube portion.

* * * * *